(12) United States Patent
Byrnes et al.

(10) Patent No.: US 7,600,940 B1
(45) Date of Patent: Oct. 13, 2009

(54) BALL JOINT WITH SPACER CUP

(75) Inventors: Thomas J. Byrnes, St. Charles, MO (US); Roger G. Sellers, Arnold, MO (US); George R. Schmidt, St. Louis, MO (US)

(73) Assignee: Federal Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 12/372,038

(22) Filed: Feb. 17, 2009

(51) Int. Cl.
*F16D 3/00* (2006.01)
(52) U.S. Cl. .......................................... 403/76; 403/131
(58) Field of Classification Search .................. 403/59, 403/76, 122–144
See application file for complete search history.

(56) References Cited

U.S. PATENT DOCUMENTS

| | | | |
|---|---|---|---|
| 2,110,148 A | | 3/1938 | Gross |
| 2,521,335 A | * | 4/1950 | Booth ........................ 403/128 |
| 2,636,758 A | * | 4/1953 | Flumerfelt .................. 403/126 |
| 3,166,333 A | | 1/1965 | Henley |
| 4,101,227 A | | 7/1978 | Herbenar et al. |
| 4,154,544 A | | 5/1979 | Gair |
| 4,765,770 A | | 8/1988 | Buhl |
| 6,010,272 A | | 1/2000 | Littman |

* cited by examiner

*Primary Examiner*—Victor MacArthur
(74) *Attorney, Agent, or Firm*—Robert L. Stearns; Dickinson Wright PLLC

(57) ABSTRACT

A ball joint includes a housing extending between open and closed ends. The housing has a cavity with a cylindrical wall extending from adjacent the closed end to an annular flange adjacent the open end. A stud extends into the cavity. An inner bearing element has a bore configured to slide relative to the stud and an outer bearing surface. An outer bearing element is configured to slide relative to the housing and has an inner bearing surface for pivotal movement with the inner bearing element outer bearing surface. An annular cup is disposed between the closed end of the housing and the outer bearing element. The cup can slide relative to the housing and has a bore allowing axial movement of the stud. A spring member imparts an axial bias force on the cup and imparts a preload between the outer bearing element and the inner bearing element.

7 Claims, 1 Drawing Sheet

BALL JOINT WITH SPACER CUP

BACKGROUND OF THE INVENTION

1. Technical Field

This invention relates generally to ball joints for linking relatively movable components to one another, and more particularly to ball joints for linking relatively movable vehicle suspension components to one another.

2. Related Art

Vehicle suspension systems typically include ball joints for coupling vehicle suspension components to one another, such as a steering yoke to a steering knuckle. Upon coupling the suspension components together with the ball joint, it is desirable to have a maximized degree of unrestricted axial movement between the coupled components. It is further desirable to impart a sufficient and predetermined preload in an angular degree of movement between the components to control their movement relative to one another. In order for the suspension system of the vehicle to sustain an optimal level of performance, it is desirable that the preload remain substantially constant over the useful life of the ball joint. By maintaining a substantially constant preload across the ball joint, the feel and performance of the suspension system can be optimized without substantial change, thereby providing the driver with a substantially constant level of performance and feel over the life of the ball joint. In addition, constant efforts are made to construct ball joints in an economical manner to minimize their cost, while also providing the ball joint with a long and useful life.

SUMMARY OF THE INVENTION

A ball joint includes a housing having an outer surface and an inner surface providing a cavity extending between an open end and a closed end of the housing. The inner surface has a cylindrical wall extending from adjacent the closed end to an annular flange extending radially inwardly from the cylindrical wall adjacent the open end. A stud having a cylindrical outer surface extends into the cavity through the open end. The ball joint has an inner bearing element and an outer bearing element. The inner bearing element has a cylindrical bore configured for close sliding movement with the cylindrical outer surface of the stud and an outer bearing surface. The outer bearing element has an outer surface configured for close sliding movement relative to the cylindrical wall of the housing and an inner bearing surface configured for relative pivotal movement with the outer bearing surface of the inner bearing element. A spring member is received in the cavity of the housing. An annular cup is disposed between the closed end of the housing and the outer bearing element. The cup has a rigid body with an outer surface configured for close sliding movement relative to the cylindrical wall of the housing and an inner surface configured to receive the stud for free relative axial movement radially inwardly therefrom. The spring member imparts a bias force on the rigid body and biases the inner bearing surface of the outer bearing element into a preload against the outer bearing surface of the inner bearing element.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
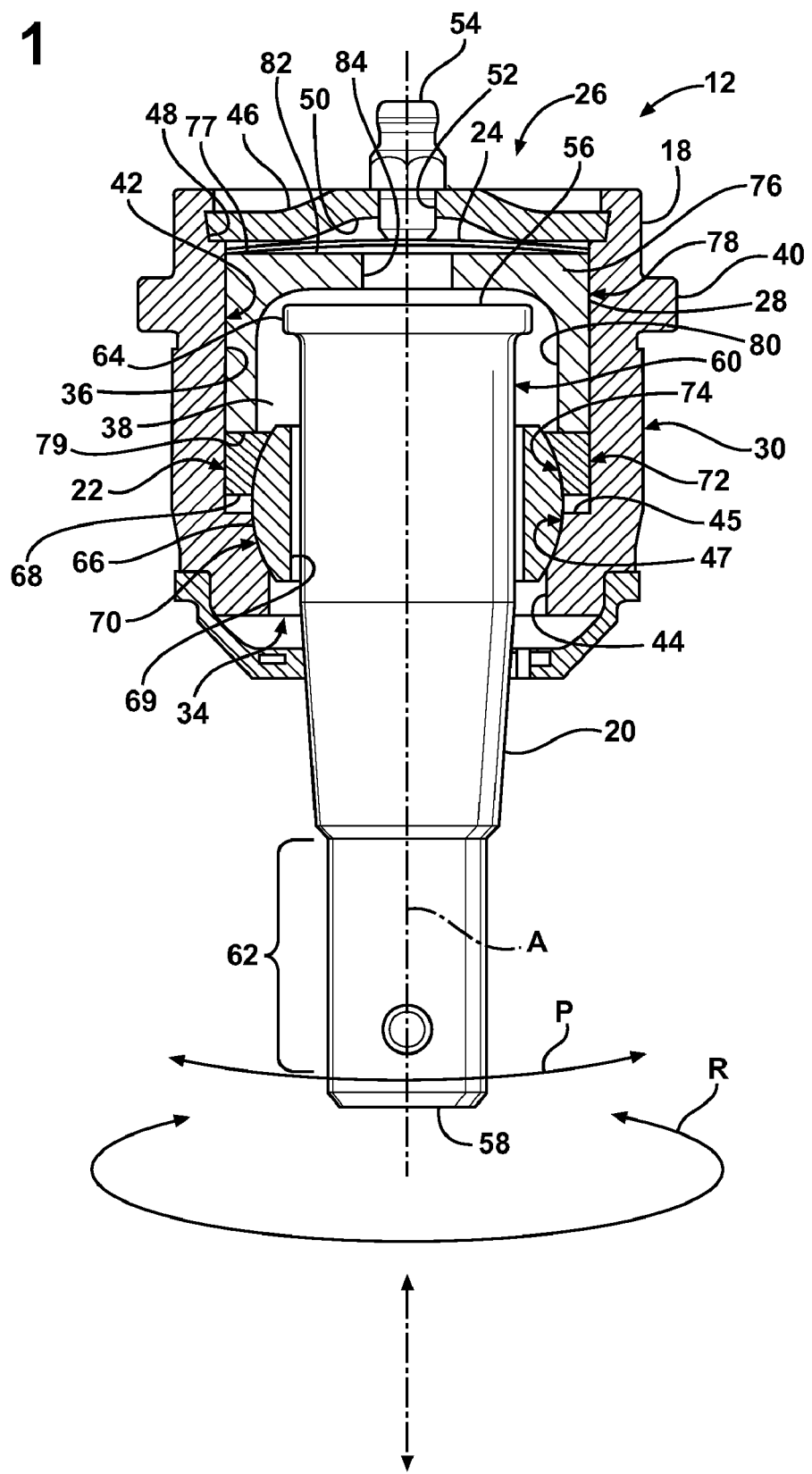
FIG. 1 is a cross-sectional view of a ball joint constructed in accordance with one presently preferred aspect of the invention.

Referring in more detail to the drawings, FIG. 1 illustrates a ball joint 12 constructed in accordance with one presently preferred embodiment of the invention. The ball joint 12 allows relative pivotal movement between a knuckle and yoke of a steering system (not shown). The ball joint 12 has a housing 18 configured for fixed attachment to the yoke and a stud 20 received in part in the housing 18 for relative movement therewith. The stud 20 has multiple degrees of freedom for movement relative to the housing 18, including axial movement along an axis (A), rotational movement about the axis A in the direction of arrow (R), and pivotal movement in the direction of arrow (P). The pivotal movement is provided by movement of a bearing assembly 22 relative to the housing 18, while the rotational and axial movement is provided by free axial and rotational movement of the stud 20 within the bearing assembly 22. The pivotal movement of the stud 20 is controlled by a predetermined bias force imparted on the bearing assembly by a spring member 24. The spring member 24 is provided as Belleville washer, and is disposed between a closed end 26 of the housing 18 and a rigid annular cup 28. Accordingly, the spring member 24 imparts an axial force on the cup 28, which in turn imparts an axial force on the bearing assembly 22, thereby regulating and controlling the force required to pivot the stud 20 extending through the bearing assembly 22. With the spring member 24 being provided as a Belleville washer, the applied axial force on the bearing assembly 22 can be tightly controlled, as the deflection of the relatively thin Belleville washer along the axial direction is minimal. Accordingly, the variance in the force required to pivot the stud 20 is tightly controlled.

The housing 18 has an outer surface 30 extending between the closed end 26 and an open end 34 and an inner surface 36 providing a cavity 38 extending between the closed and open ends 26, 34. The outer surface 30 is configured for attachment to one of the suspension members, and is illustrated here as having a radially outwardly extending flange 40 to facilitate fixing the housing 18 to the yoke 16. The inner surface 36 has a straight cylindrical wall 42 extending from adjacent the closed end 26 to an annular shoulder or flange 44 that extends radially inwardly from the cylindrical wall 42 adjacent the open end 34. The flange 44 presents an annular shoulder 45 extending substantially perpendicular to the cylindrical wall 42 and has an annular concave semispherical bearing surface 47 configured to receive and abut a portion of the bearing assembly 22 for pivotal movement. The closed end 26 is illustrated here as being provided by an end cap 46 fixed within an annular groove 48 extending into the inner surface 36 of the housing 18. The end cap 46 is represented here as being dome shaped with a concave surface 50 facing the cavity 38. It should be recognized that any suitable mechanism can be used to attach the end cap 46 to the housing, including snap rings (not shown), for example. The end cap 46 preferably has a central opening 52 configured for fixed receipt of a lubrication fitting 54. The open end 34 is preferably sealed by a seal boot 52 to prevent the ingress of contamination.

The stud 20 has an elongate body extending between opposite ends 56, 58. A cylindrical outer surface 60 extends axially from one end 56 and a threaded portion 62 extends from the other end 58 for attachment to one of the suspension members such as the knuckle. The stud 20 is represented here as having an annular flange 64 extending radially outwardly from the cylindrical outer surface 60 adjacent the end 56 received in the housing 18. The flange 64 acts to prevent the stud 20 from being inadvertently removed from the housing 18 upon being assembled via positive interference with the bearing assembly 22.

The bearing assembly 22 has an inner bearing element 66 and an outer bearing element 68. The inner bearing element 66 has a cylindrical bore 69 configured for close sliding receipt and movement with the cylindrical outer surface 60 of the stud 20. Accordingly, in use, the stud 20 is able to move freely in both the axial and rotational directions. The inner bearing element 66 also has an outer semispherical bearing surface 70. The outer bearing surface 70 has a spherical radius that conforms with the radius of the semispherical bearing surface 47 in the flange 44 of the housing 18, such that the respective bearing surfaces 47, 70 are free to pivot against one another.

The outer bearing element 68 has an outer cylindrical surface 72 configured for close sliding axial movement relative to the cylindrical wall 42 of the housing 18. The outer bearing element 68 also has an inner semispherical bearing surface 74 configured for pivotal movement against the outer bearing surface 70 of the inner bearing element 66.

The cup 28 has a rigid body 76 fabricated from any suitable metal material or possibly a high strength polymeric material. The cup 28 has an outer cylindrical surface 78 and an inner surface 80 extending between opposite ends 77, 79. The outer surface 78 is configured for close sliding movement relative to the cylindrical wall 42 of the housing 18 and the inner surface 80 is configured to receive the stud end 56 and cylindrical outer surface 60 for free relative axial movement radially inwardly therefrom. Accordingly, the inner surface 80 has an inner diameter that is greater than the outer diameter of the stud end 56 and cylindrical outer surface 60. One of the ends 77 has an end wall 82 extending radially inwardly from the inner surface 80 of the cup 28. The end wall 82 is preferably provided with an opening 84 to allow passage of lubricant therethrough.

The Bellville washer 24 can be fabricated of any suitable spring material and provided having any suitable outer and inner diameters. In addition, the spring member 24 can have any suitable axial thickness in relaxed and compressed conditions, thereby being able to impart a precise and narrow range of applied axial force in use, depending on the physical characteristics of the selected Bellville washer. Bellville washers have a relative small range of axial compression, and thus, allow for the imparted axial force, which is a function of axial distance compressed, to be tightly controlled. By way of example and without limitation, one spring member 24 could be provided having a relaxed, uncompressed height of about 0.075", a compressed height of about 0.035", and a spring thickness of about 0.030", thereby providing a range of about 0.005" axial movement allowed by the spring member 24 upon initial assembly. Accordingly, the range of axial force imparted by the spring member 24 has a relatively narrow range of applied force variance, thereby providing the ball joint 12 with a substantially constant pivoting motion and performance. Stated another way, the force required to pivot the stud 20 is substantially constant given the narrow range of axial force imparted on the bearing assembly 22 by the spring member 24.

In use, with the threaded portion 62 attached to the knuckle and the housing 18 attached to the yoke, the ball joint 12 provides the desired axial movement via axial movement of the stud 20 relative to the housing 18 and bearing assembly 22, the desired rotational movement via relative rotational movement between the stud 20 and the bearing assembly 22, and the desired pivotal movement via relative pivotal movement of the inner bearing element 66 with the outer bearing element 68 and the bearing surface 47 of the housing 18. The axial and rotational movement is provided by a clearance between the stud outer surface 60 and the inner bearing element bore 69, and the pivotal movement is provide by the sliding movement between the inner and outer bearing elements 66, 68. The axial movement is maximized by the extended axial distance provided by the cup inner surface 80. Although the distance can be extended as desired by increasing or decreasing the overall length of the cup inner surface 80, the force required to pivot the stud 20 can remain largely unaffected as a result of the minimal axial compression provided by the Belleville washer 24.

In one presently preferred embodiment, the annular cup 28 is disposed between the closed end 26 of the housing 18 and the outer bearing element 68, with one side of the spring member 24 engaging the end wall or end cap 46 of the housing 18 and an opposite side of the spring member 24 engaging the end 77 of the cup 28. As such, it should be recognized that the end 77 of the cup 28 is preferably provided as a substantially flat, planar surface over a sufficient annular area to abut the spring member 24. The spring member 24 imparts a bias force on the rigid body of the housing 18, thereby biasing the inner bearing surface 74 of the outer bearing element 68 into a preload against the outer bearing surface 70 of the inner bearing element 66. The spring member 24 provides the outer bearing element 68 with a maximum possible axial movement relative to the cylindrical wall between a range of about 0.002"-0.008" upon initial assembly. As such, as noted above, the preload between the mating bearing surfaces 70, 74 can be tightly controlled, thereby providing a narrow and predictable range of torque required to pivot the stud 20.

Obviously, many modifications and variations of the present invention are possible in light of the above teachings. It is, therefore, to be understood that within the scope of the appended claims, the invention may be practiced otherwise than as specifically described.

What is claimed is:

1. A ball joint, comprising:

a housing having an outer surface and an inner surface providing a cavity extending between an open end and a closed end of said housing, said inner surface having a cylindrical wall extending from adjacent said closed end to an annular flange extending radially inwardly from said cylindrical wall adjacent said open end, and a substantially spherical inner bearing surface;

a stud having a cylindrical outer surface extending into said cavity through said open end;

an inner bearing element having a cylindrical bore configured for close sliding movement with said cylindrical outer surface of said stud and a substantially spherical outer bearing surface configured for relative pivotal sliding against said substantially spherical inner bearing surface of said housing;

an outer bearing element having an outer surface configured for close sliding movement relative to said cylindrical wall of said housing and a substantially spherical inner bearing surface configured for relative pivotal movement with said outer bearing surface of said inner bearing element;

a spring member received in said cavity; and an annular cup disposed between said closed end of said housing and said outer bearing element, said annular cup having a rigid body with an outer surface configured for close sliding movement relative to said cylindrical wall of said housing and an inner surface configured to receive said stud for free relative axial movement radially inwardly therefrom, said spring member imparting a bias force on said rigid body to bare against said outer bearing member thereby biasing said inner bearing surface of said outer bearing element into a preload against said outer bearing surface of said inner bearing element.

2. The ball joint of claim 1 wherein said annular cup is disposed between said spring member and said outer bearing element.

3. The ball joint of claim 2 wherein said annular cup has an end wall extending radially inwardly from said inner surface of said annular cup, said spring member engaging said end wall.

4. The ball joint of claim 3 wherein said closed end of said housing has a lubrication fitting and said end wall of said annular cup has an opening allowing lubricant to pass therethrough.

5. The ball joint of claim 3 wherein said stud has a free end axially movable between said end wall of said annular cup and said inner bearing element.

6. The ball joint of claim 1 wherein said spring member is a Belleville washer.

7. The ball joint of claim 6 wherein said Belleville washer provides said outer bearing element with a maximum axial movement relative to said cylindrical wall of about 0.008".

\* \* \* \* \*